(12) United States Patent
Altman et al.

(10) Patent No.: US 8,121,800 B2
(45) Date of Patent: Feb. 21, 2012

(54) CAPACITATIVE NODE MEASUREMENT IN A CAPACITATIVE MATRIX PRESSURE INDUCER

(75) Inventors: Kevin Altman, Calgary (CA); Ian Main, Calgary (CA); Terrence Russell, Calgary (CA)

(73) Assignee: Xsensor Technology Corporation, Calgary, Alberta (CA)

( * ) Notice: Subject to any disclaimer, the term of this patent is extended or adjusted under 35 U.S.C. 154(b) by 525 days.

(21) Appl. No.: 12/297,959

(22) PCT Filed: Apr. 25, 2007

(86) PCT No.: PCT/CA2007/000699
§ 371 (c)(1),
(2), (4) Date: Mar. 24, 2009

(87) PCT Pub. No.: WO2007/121586
PCT Pub. Date: Nov. 1, 2007

(65) Prior Publication Data
US 2009/0216466 A1    Aug. 27, 2009

Related U.S. Application Data

(60) Provisional application No. 60/745,562, filed on Apr. 25, 2006.

(51) Int. Cl.
*G01L 9/12* (2006.01)

(52) U.S. Cl. .......................................... 702/52

(58) Field of Classification Search ............... 702/52
See application file for complete search history.

(56) References Cited

U.S. PATENT DOCUMENTS

| | | |
|---|---|---|
| 3,565,195 A | 2/1971 | Miller |
| 3,875,481 A | 4/1975 | Miller et al. |
| 3,886,447 A | 5/1975 | Tanaka |
| 3,970,925 A | 7/1976 | Procter et al. |
| 4,065,715 A | 12/1977 | Jaffe et al. |
| 4,166,974 A | 9/1979 | Vermeers |
| 4,187,460 A | 2/1980 | Dauge et al. |
| 4,266,263 A | 5/1981 | Haberl et al. |
| 4,370,697 A | 1/1983 | Haberl et al. |
| 4,584,625 A | 4/1986 | Kellogg |
| 4,621,227 A | 11/1986 | Venema |
| 4,633,168 A | 12/1986 | Venema |
| 4,986,136 A | 1/1991 | Brunner et al. |
| 5,343,157 A | 8/1994 | Deschamps |
| 5,447,076 A | 9/1995 | Ziegler |
| 5,693,886 A | 12/1997 | Seimiya et al. |
| 6,241,679 B1 | 6/2001 | Curran |
| 6,826,968 B2 | 12/2004 | Manaresi et al. |
| 2002/0167479 A1* | 11/2002 | Janssen et al. ............... 345/103 |

* cited by examiner

*Primary Examiner* — Tung S Lau
(74) *Attorney, Agent, or Firm* — Bennett Jones LLP

(57) ABSTRACT

A method and system for measuring the distribution of pressure forces over a selected area includes a sensor having an array of pressure sensing capacitance nodes formed by intersecting rows and columns, where measured capacitance of a node is compared to a fixed value of reference capacitance placed on each row that can be measured as if it was another node.

9 Claims, 3 Drawing Sheets

CAPACITATIVE NODE MEASUREMENT IN A CAPACITATIVE MATRIX PRESSURE INDUCER

FIELD OF THE INVENTION

The present invention relates to methods and apparatuses for the active measurement of the distribution of pressure between contact and supporting surfaces.

BACKGROUND OF THE INVENTION

Currently, many technologies exist to measure the pressure of two contact surfaces. However, fewer options are available when interested in creating low cost arrays of pressure measurement elements to determine the pressure distribution. In these cases, the most common options are based on creating arrays of capacitive, resistive or piezo-electric components. A conventional capacitive measuring pad is constructed of transverse conductive strips separated by a compressible insulator to form a matrix of pressure sensitive capacitive nodes. The nodes are repetitively scanned in sequence by a microcomputer to measure their respective capacitances, from which measurements a pressure map is then derived. The resulting pressure map may be displayed on a color graphics monitor with different colors representing different pressures.

Each of these technologies operates similarly from the point of view that an electrical signal is injected into the array and a measurement is performed on the subsequent output signal from the array. As well, in each method, a specific node under consideration must be separated or isolated from the other nodes in the matrix. This is often referred to as multiplexing and can be performed on either the inputs or outputs of the array or both. The actual process of isolating the node from the other nodes may vary as there are alternative solutions to this problem.

Node capacitance is found by measuring the response of the node to a driving signal of a known voltage. This measurement is accomplished by connecting one of the node's transverse conductive strips (columns) to the driving source and the node's other conductive strips (rows) to a sense amplifier. In order to isolate the node of interest from the influence of surrounding nodes, all of the columns and rows except the two intersecting the selected node are connected to ground. An excite signal is then injected onto the desired ungrounded column and the received signal is measured from the desired ungrounded row. The measuring step is repeated for each node on the row. Once each node along a row is measured, the desired row is changed and the measurement process is repeated until all nodes have been measured. This yields a matrix of measurement data called a frame with the number of measurement elements equal to max[column] multiplied by max[row].

By previously determining the relationship between pressure and received signal amplitude for a sensor through a process called calibration, the pressure at each capacitive node or sensor cell can be estimated for each frame, thereby yielding a pressure image of any objects making contact with the sensor between them.

However, grounding of the unmeasured columns and rows does not perfectly isolate the node of interest from the effects of the other nodes unless a zero impedance arrangement such as a current-sensing amplifier is used to measure the output of the matrix, as is the case in U.S. Pat. No. 5,010,772 (the contents of which are incorporated herein by reference). The input impedance to ground of the sense amplifier is made negligibly small with respect to the other system impedance. In this way, only the column connected to the driving source has a voltage impressed on it, and the other columns of all other nodes in the system are maintained at ground potential, thus allowing an accurate measurement of the one capacitance. However, even with grounding of the sense amplifier, when the other nodes have changing pressure, and hence changing capacitance, there is still an error in the selected node measurement unless the input impedance of the signal sensing circuitry is identically zero. Compounding the non-zero input impedance error is the fact that the magnitude of the error is a dynamic variable based on what pressure is being applied to the other unused nodes.

Therefore, there is a need in the art for alternative methods of measuring individual node capacitance, in a pressure mapping system.

SUMMARY OF THE INVENTION

The present invention provides a new method of measuring individual node capacitance by placing a fixed value of reference capacitance on each row that can be measured as if it was another node, and through this determine a base measurement value for a fixed capacitance in a variable system. From this, all subsequent measurements of node capacitance along the row can be compared to this base measurement value. The comparison process comprises determining the ratio of the current sensor cell measurement (the node at a specific row and column with other lines grounded) to that of the measured value for the fixed node. Once this ratio has been determined for each node, these values can be used for estimating the capacitance and therefore pressure at each individual node.

Therefore, in one aspect, the invention may comprise a method of measuring the distribution of pressure forces over a selected area comprising the steps of:

(a) placing a sensor over the selected area, the sensor having a plurality of linear conductor columns and a plurality of linear conductor rows, wherein the columns are not parallel to the rows, and an array of sensor cells each formed at the intersection of a column and a row, and wherein the columns and rows are respectively disposed on opposite sides of a sheet of a compressible dielectric, and wherein each sensor cell has a capacitance that varies in accordance with compression of the insulating material at said intersection;

(b) selecting a single column and applying a voltage to the selected column;

(c) selecting a single row;

(d) measuring an electrical current of the selected row to thereby measure the capacitance of the sensor cell at the intersection of the selected column and row while grounding each of the non-selected columns and each of the non-selected rows to isolate the sensed sensor cell from the effects of changes in capacitance of non-sensed sensor cells;

(e) providing a fixed reference capacitance for the selected row; and (f) determining a pressure measurement for the sensed sensor cell by comparing the measured capacitance of the sensed sensor cell and the fixed reference capacitance.

In another aspect, the invention may comprise a system for monitoring the distribution of forces on a surface, comprising:

(a) a sensor having a plurality of linear conductor columns and a plurality of linear conductor rows, wherein the columns and rows are not parallel, and an array of sensor cells each formed at the intersection of a column and a row, and wherein the columns and rows are respectively disposed on opposite sides of a sheet of a compressible dielectric, and wherein each sensor cell has a capacitance that varies in accordance with compression of the insulating material at said intersection;

(b) means for selecting a single column and applying a voltage to the selected column;

(c) means for selecting a single row;

(d) means for measuring an electrical current of the selected row to thereby measure the capacitance of the sensor cell at the intersection of the selected column and row;

(e) means for grounding each of the non-selected columns and each of the non-selected rows to isolate the sensed sensor cell from the effects of changes in capacitance of non-sensed sensor cells;

(f) means for providing a fixed reference capacitance for each row; and (g) means for determining a pressure measurement for the sensed sensor cell by comparing the measured capacitance of the sensed sensor cell and the fixed reference capacitance.

BRIEF DESCRIPTION OF THE DRAWINGS

The invention will now be described by way of an exemplary embodiment with reference to the accompanying simplified, diagrammatic, not-to-scale drawings. In the drawings.

DETAILED DESCRIPTION OF THE INVENTION

The present invention provides for a novel method and pressure sensing apparatus for the active measurement of the distribution of pressure between two surfaces. When describing the present invention, all terms not defined herein have their common art-recognized meanings. To the extent that the following description is of a specific embodiment or a particular use of the invention, it is intended to be illustrative only, and not limiting of the claimed invention. The following description is intended to cover all alternatives, modifications and equivalents that are included in the spirit and scope of the invention, as defined in the appended claims.

Figure 1:
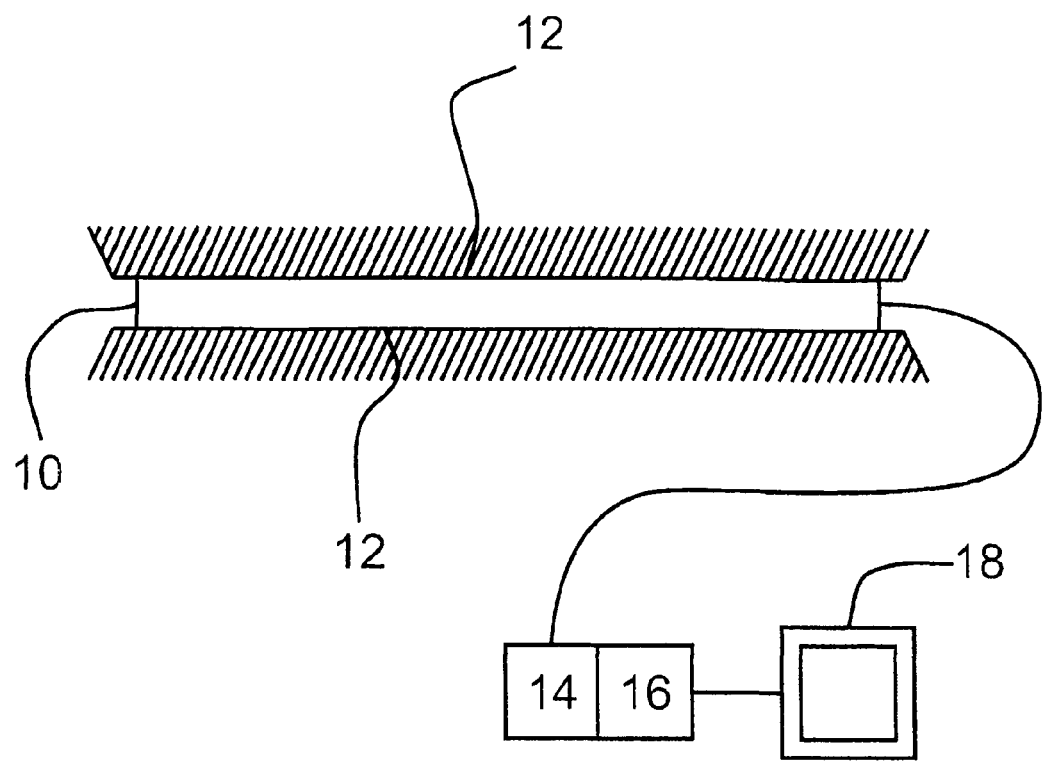
FIG. 1 is a view of one embodiment of the present invention.

As shown in FIG. 1, one embodiment of the pressure measuring system of the present invention is comprised of three main components, a pressure sensitive pad (10) that can be placed between two object surfaces (12) to measure pressure distribution of one object against the other, an interface unit (14) for supplying electrical driving signals to the pad (10) and receiving pressure sensitive output signals from it, and a signal processing device, for example a microprocessor (16), which may be a desktop, laptop or handheld computer, with an associated graphic display monitor (18), for controlling the interface unit and processing the output signals from the pad.

In operation, the pad (10) produces output signals that are indicative of the pressure that is sensed at each of a multiplicity of points over its surface area. The computer (16) receives these signals, by way of the interface unit (14), and causes a display to be generated which illustrates the distribution of the weight of the patient over the area of the pad.

Figure 2:
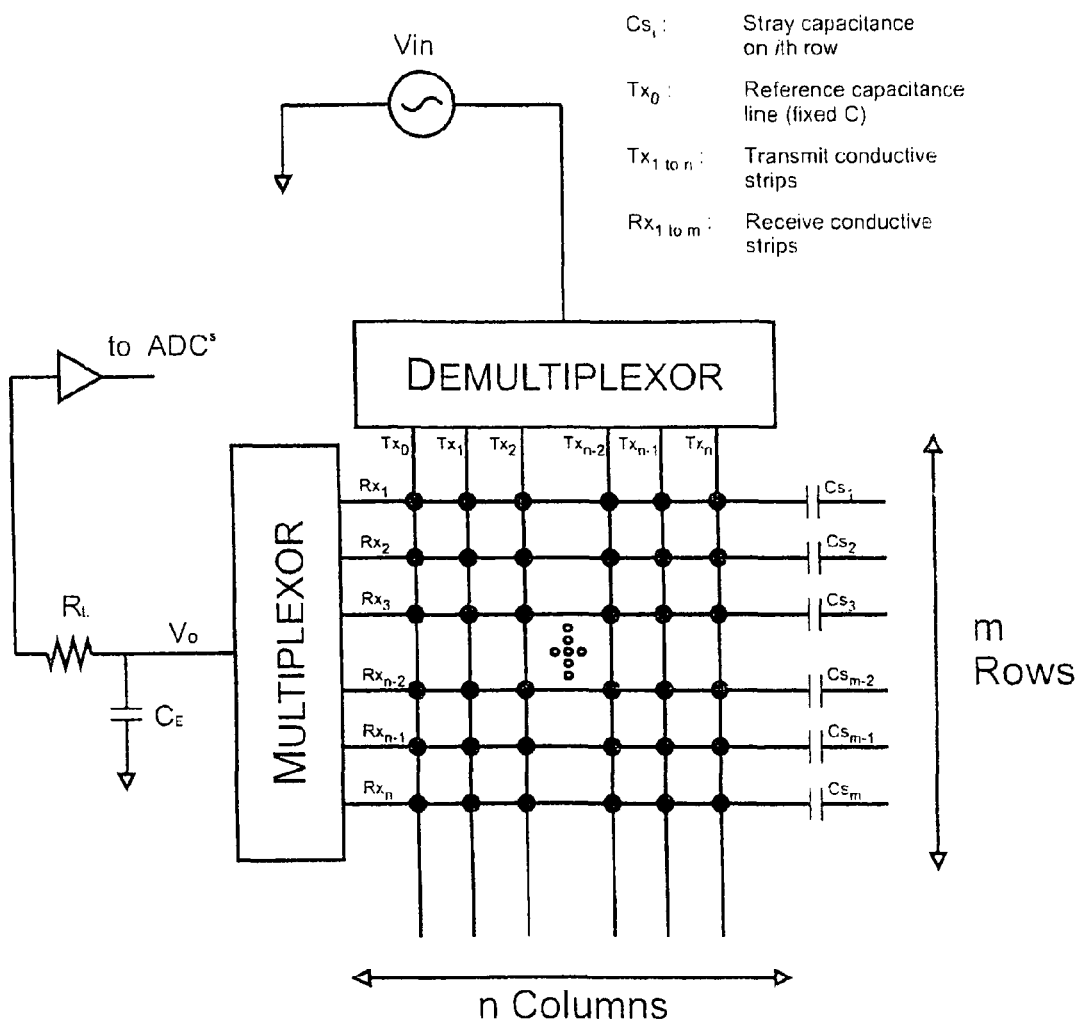
FIG. 2 is schematic representation of the sensor and sensor cells of the present invention.

The basic construction of the pad (10) is illustrated in FIG. 2. It comprises a sensor having a compressible dielectric layer having two linear arrays of conductors respectively disposed on opposite sides thereof. The dielectric layer can be a compressible elastomeric material. A "column" means the conductor that carries the excite signal from the signal processor to the sensor cell. A "row" means the conductor that carries the excite signal from the sensor cell to the measurement electronics. The columns are a series of substantially parallel linear conductors that are oriented in one direction. The rows are substantially parallel linear conductors which are oriented in a direction that is preferably, but not necessarily, perpendicular to the orientation of the columns. Each intersection of a column with a row defines a measuring node or sensor cell. Thus, the sensor is a device that contains a plurality of individual sensor cells that deform under pressure thus causing changes in the cell's internal capacitive coupling that can be measured by an external device. The capacitive coupling of each sensor cell changes under pressure.

As used herein, "capacitance" means that property of a system of conductors and dielectric which permits the storage of electricity when potential difference exists between the conductors. Its value is expressed as the ratio of a quantity of electricity to a potential difference. A capacitance value is always positive. The charge which must be communicated to the body to raise its potential one unit, represented by $C=Q/V$, where C is the capacitance, Q the quantity of charge, and V the potential.

As shown in FIG. 2, the measuring nodes are disposed in a matrix arrangement and each node represents a capacitor. All of the capacitors in a row of the matrix are connected in common to one of the columns of the first array, and all of the capacitors in a column of the matrix are connected in common to one of the rows of the other array. When it is desired to measure the capacitance of a particular node, a driving signal having a known voltage $V_I$ is applied to the column in which the node is located.

The input voltage is applied to each of the columns by a demultiplexor, and the output voltage is measured on each row via a conventional multiplexor and an analog-digital converter (ADC), as is shown in FIG. 2.

Figure 3:
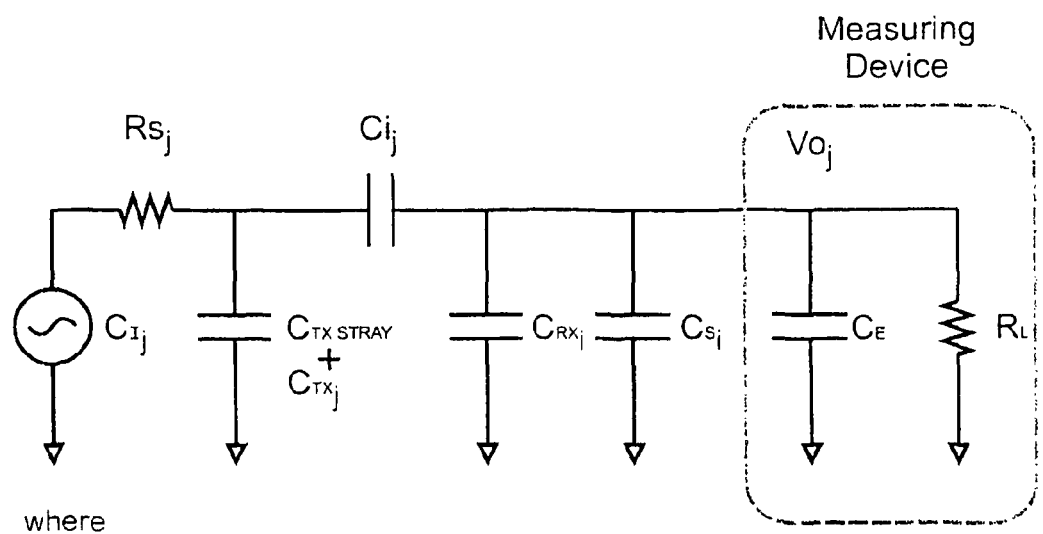
FIG. 3 is schematic representation of an electrical model for measuring the capacitance of a single sensor cell.

Equation (1) is the standard voltage transfer function for the sensor model shown in FIG. 3.

$$\frac{V_{O_i}}{V_{I_j}} = \frac{sC_{ij} \cdot R_L}{sC_{RX_i} \cdot R_L + 1} \tag{1}$$

where $V_{I_j}$—Input Voltage on jth column $V_{O_i}$—Output Voltage on ith row $V_{O_{ij}}$—Output Voltage of ith row given Input Voltage is on jth column $V_{O_{i0}}$—Output Voltage of ith row given Input Voltage is on zeroth column $C_E$—Input Capacitance of measuring system $C_{ij}$—Node capacitance at the ith row and jth column $R_L$—Input Resistance of measuring system Depending on which row and column are selected, a different transfer function occurs which is denoted by the ij subscripts. Simple manipulation of (1) allows one to solve for $C_{ij}$ as a function of the other parameters:

$$C_{ij} = \left(C_{RX_i} + \frac{1}{sR_L}\right) \cdot \frac{V_{O_i}}{V_{I_j}} \tag{2}$$

$$C_{RX_i} = C_s + C_E + \sum_{j=0}^{n} C_{ij} \quad (3)$$

where $C_S$ is stray capacitance or the remaining capacitance not accounted for by a sensor cell capacitance ($C_{ij}$) and input capacitance ($C_E$) of the measuring system.

However, the calculation of $C_{ij}$ is based on $C_{RXi}$, which is the sum of other varying node capacitances plus external capacitances that may also be time varying. In a conventional method, the reduction of $R_L$ & w (radian or angular frequency) results in a minimization of the impact of this interrelated aspect of the sensor, but this is a cumbersome solution.

In the present invention, individual node capacitance may be measured by placing a fixed value of reference capacitance on each row that can be measured as if it was another node (a "fixed node"), and through this determine a base measurement value for a fixed capacitance in a variable system. Thus, as shown in FIG. 2, $T_{x0}$ is a column that is made up of fixed capacitance versus the variable capacitance of the standard sensor elements. The fixed capacitance column may be placed anywhere in the system as long as it is placed in parallel to the other elements. It can also be measured either before, in the middle or after the other elements are measured in the row. The $T_{x0}$ measurement is stored and compared to the other rows at the appropriate moment to isolate just the capacitance of the node of interest. From this, all subsequent measurements of node capacitance along the row can be compared to this base measurement value. The comparison process is simply determining the ratio of the current sensor cell measurement (the node at a specific row and column ($C_{ij}$) with other rows and columns grounded) to that of the measured value for the fixed node. Once this ratio has been determined for each node, these values can be used for estimating the capacitance or pressure at each individual node.

The equivalent circuit that is formed by the structure of FIG. 2 is schematically illustrated in FIG. 3. With the introduction of a fixed capacitance along the row, the equations may then be manipulated to utilize the fixed node capacitance measurement and remove the error introduced by the other nodes. Thus, $$\left|\frac{V_{O_i}}{V_{I_j}}\right| = \frac{w \cdot C_{ij} \cdot R_L}{\sqrt{1 + (w \cdot C_{RX_i} \cdot R_L)^2}} \quad (4)$$

From equation (4), the result of equation (5) is arrived at by determining the ratio of the node of interest transfer function to the reference (fixed capacitor) node transfer function:

$$C'_{ij} = \frac{C_{ij}}{C_{i0}} = \left|\frac{V_{O_{ij}}}{V_{O_{i0}}}\right| \quad (5)$$

where $C_{i0}$ is the capacitance of fixed reference capacitor on ith row

The input voltage $V_{Ij}$ is either constant or known but varying and thus cancels out as listed in equation (5) or becomes a constant scaling factor if known. One skilled in the art will appreciate that operation of equation (5) removes the adverse effects that were highlighted in Equation (2).

From this point on, the normalized $C'_{ij}$ can be used, or if the exact value of $C_{i0}$ is known, $C_{ij}$ can be calculated and used. Use of either is acceptable in a calibrated system as the calibration process works effectively to translate both values into the desired reading at the cell of interest.

What is claimed is:

1. A method of measuring the distribution of pressure forces over a selected area comprising the steps of:
    (a) placing a sensor over the selected area, the sensor having a plurality of linear conductor columns and a plurality of linear conductor rows, wherein the columns are not parallel to the rows, and an array of sensor cells each formed at the intersection of a column and a row, and wherein the columns and rows are respectively disposed on opposite sides of a sheet of a compressible dielectric, and wherein each sensor cell has a capacitance that varies in accordance with compression of the insulating material at said intersection;
    (b) selecting a single column and applying a voltage to the selected column;
    (c) selecting a single row;
    (d) measuring an electrical current of the selected row to thereby measure the capacitance of the sensor cell at the intersection of the selected column and row while grounding each of the non-selected columns and each of the non-selected rows to isolate the sensed sensor cell from the effects of changes in capacitance of non-sensed sensor cells;
    (e) providing a fixed reference capacitance for the selected row; and
    (f) determining by a processor a pressure measurement for the sensed sensor cell by comparing the measured capacitance of the sensed sensor cell and the fixed reference capacitance.

2. The method of claim 1 wherein steps (b) through (f) are repeated for the entire array of sensor cells.

3. The method of claim 1 or 2, wherein the fixed reference capacitance for the selected row is provided by a fixed capacitance column which intersects each of the rows.

4. The method of claim 1 or 2 wherein the comparison of the measured capacitance of the sensed sensor cell and the fixed reference capacitance comprises a ratio of the measured capacitance and the fixed reference capacitance.

5. A system for monitoring the distribution of forces on a surface, comprising:
    (a) a sensor having a plurality of linear conductor columns and a plurality of linear conductor rows, wherein the columns and rows are not parallel, and an array of sensor cells each formed at the intersection of a column and a row, and wherein the columns and rows are respectively disposed on opposite sides of a sheet of a compressible dielectric, and wherein each sensor cell has a capacitance that varies in accordance with compression of the insulating material at said intersection;
    (b) means for selecting a single column and applying a voltage to the selected column;
    (c) means for selecting a single row;
    (d) means for measuring an electrical current of the selected row to thereby measure the capacitance of the sensor cell at the intersection of the selected column and row;
    (e) means for grounding each of the non-selected columns and each of the non-selected rows to isolate the sensed sensor cell from the effects of changes in capacitance of non-sensed sensor cells;
    (f) means for providing a fixed reference capacitance for each row; and (g) means for determining a pressure measurement for the sensed sensor cell by comparing the measured capacitance of the sensed sensor cell and the fixed reference capacitance.

6. The system of claim 5 wherein the means for selecting a single column and applying a voltage to the selected column comprises a demultiplexor.

7. The system of claim 5 or 6 wherein the means for selecting a single row and measuring the electric current of the selected row comprises a multiplexor.

8. The system of claim 5 wherein the means for determining a pressure measurement comprises means for calculating a ratio of the measured capacitance of the sensed sensor cell and the fixed reference capacitance.

9. The system of claim 5 further comprising a computer processor for processing the measured capacitance for the entire array of sensor cells and graphically displaying the force distribution on a surface.

* * * * *

UNITED STATES PATENT AND TRADEMARK OFFICE
CERTIFICATE OF CORRECTION

PATENT NO.         : 8,121,800 B2
APPLICATION NO.    : 12/297959
DATED              : February 21, 2012
INVENTOR(S)        : Kevin Altman, Ian Main and Terrence Russell It is certified that error appears in the above-identified patent and that said Letters Patent is hereby corrected as shown below:

Title Page, item (54) and Col. 1, line 1-3; should read,

Title of Patent          CAPACITIVE NODE MEASUREMENT IN A
                         CAPACITIVE MATRIX PRESSURE TRANSDUCER Signed and Sealed this
Eighth Day of May, 2012

David J. Kappos
*Director of the United States Patent and Trademark Office*